United States Patent Office 3,567,822
Patented Mar. 2, 1971

3,567,822
SUBSTANCES IMPARTING A NON-SPECIFIC IMMUNITY AND STIMULATING THE NATURAL DEFENSES OF THE SYSTEM
Raymond Francois Jacques Sarbach and Dimitri Yavordios, Chatillon-sur-Chalaronne, Ain, France, assignors to Institut de Recherche Scientifique (I.R.S.), Chatillon-sur-Chalaronne, Ain, France
No Drawing. Filed July 11, 1968, Ser. No. 743,962
Claims priority, application France, July 12, 1967, 114,081
Int. Cl. A61k 27/00
U.S. Cl. 424—92          3 Claims

ABSTRACT OF THE DISCLOSURE

Substances imparting a non-specific immunity and stimulating the natural defenses of the system obtained in a soluble state from a Neisseria perflava germ by the action af amino-acids entailing the lytic conversion of living microbial bodies.

---

The present invention consists of introducing into humans therapeutics substances imparting a non-specific immunity to the system, i.e., able to develop rapid and powerful reactions in it which enable the ensuring either protection against various attacking agents, or the treating of disorders that they cause.

These substances are obtained in a soluble state from at least a pathogenic or saprophyte germ by the action of amino-acids able to entail the lytic conversion of living microbial bodies.

They are submitted in the forms usually utilized in the pharmaceutical profession (for instance, drops, phials, tablets, suppositories, etc.) and can be administered by various means: injectable, oral, perpucuous, etc.

PRINCIPLE OF MANUFACTURE

The above-mentioned defined substances are obtained by the action of an amino-acid, such, for instance, a glycocoll, in given temperature, pH and concentration conditions, on an aqueous suspension of at least one living microbial germ.

PROCESS OF MANUFACTURE

According to a preferred manufacturing process, the above-mentioned substances are prepared as follows:

1. Selection and culture of the microbial germ or germs:

(a) The germs may be selected, on account of their activity, from various bacterial families, in particular, the following:

Neisseriaceae: specifically represented by the kind: Neisseria (*N. catarrhalis*); (*N. flava*); (*N. perflava*).

Micrococcaceae: specifically represented by the kinds: Diplococcus [*D. pneumoniae* (various types)]; Streptococcus *S. pyogeneious* (various groups); *S. fecalis* (various groups); Gaffkya [*G. tetragena*]; Staphylococcus [*S. pyogenes*, var. *aureus*]; Micrococcus.

Parvobacteriaceae: represented specifically by the kinds: Pasteurella; Brucella; Hemophilus [*H. influenzae*], [*H. pertuasis*].

Enterobacteriaceae: represented specifically by the kinds: Escherichia [*E. coli*]; Klebsiella [*K. pneumoniae*]; *K. aerogenes*; Proteus; Salmonella; Moraxella.

Pseudomonadaceae: represented specifically by the kind: Pseudomonas [*P. aeruginosa*].

Systematic comparative tests, during which it was sought in particular for the possibility of applying the preparation process on an industrial scale, have led more particularly to retaining, owing to its very considerable power of stimulating non-specific defenses, *Neisseria perflava*.

(b) The germs are cultivated according to the usual bacteriological methods, in the best culture conditions suited to their development.

(c) The germs are collected at the active growth stage according to known methods so as to produce one or more aqueous suspensions containing the living germs in question, isolated or in a mixture.

2. Production of active substances.—The aqueous suspension or suspensions of the above-mentioned living germs are treated by adding a quantity of amino-acid, such preferably, as glycocoll so that generally the final concentration of amino-acid is comprised between 5 and 10% and the pH of the mixture in the region of 6 to 7.

The mixture is raised to a suitable temperature in a stove, 37° C., for instance, during the necessary time for the lysis of at least 50% of the microbial bodies, being, in the case of *Neisseria perflava*, for instance, about 4 days.

Thus, there is produced under the action of amino-acid, a liquid preparation containing active substances in solution able to develop a non-specific immunity in animals or mankind.

3. Medicament manufacture.—The above-mentioned aminolysate is used after—if so required—bacteriological filtration and the addition of a preservative, of a stabilizer or any other eventual adjuvant necessary permitted by the law and after having been treated according to the usual methods in the pharmaceutical profession so as to produce a form of administering suitable for the therapeutics of mankind.

According to the administration method, the solution is used itself or the lyophilized product.

IDENTIFICATION AND CHECKING

1. Immunological check: preparing an anti-serum for a rabbit

After verifying the absence of natural agglutinae, a heated suspension (60° C.—1 hour) of *N. perflava* is injected into a rabbit weighing about 6 lbs. by intravenous means. The microbial suspensions are collected on gelose and diluted so as to measure, with 1 cm. tank, 150 Meunier units.

The rate of injections is as follows:

|  | Ml. |
|---|---|
| 1st injection | 0.5 |
| 2nd injection | 1 |
| 3rd injection | 2 |
| Repeated after 13 days' rest | 2 |

The serum thus prepared agglutinates a suspension of *N. perflava* measuring 80 Meunier units in a 1/80 dilution.

Deviation reaction of the complement

The deviation of the complement is carried out (R. of Kolmer).

Reagents used

The method for deciding titration is given by Tables I and II hereafter:

| | |
|---|---|
| Hemolytic serum | 2 units in 2 drops. |
| Complement | 2 units in 8 drops. |
| Antigen | lysate. |
| Anti-serum | Anti-serum of the rabbit (inactivated 56° C., 20 minutes). |

Red sheep's corpuscles 2%.
Physiological serum.

In five hemolysis tubes, we consider:
No. 1 tube reactions
No. 2 serum reference
No. 3 antigen serum reference
No. 4 hemolytic couple reference
No. 5 red corpuscles reference
The reaction takes place according to the table:

|  | 1 | 2 | 3 | 4 | 5 |
|---|---|---|---|---|---|
| Antigen | [1]2 | 0 | 2 | 0 | 0 |
| Physiological serum | 0 | 2 | 1 | 3 | 13 |
| Inactivated serum | 1 | 1 | 0 | 0 | 0 |
| Complement, 2 units | 8 | 8 | 8 | 8 | 0 |

[1] Drops.

NOTE.—Fixing, 18 hours at +4° C.

|  | 1 | 2 | 3 | 4 | 5 |
|---|---|---|---|---|---|
| Hemolytic serum 2 units | 2 | 2 | 2 | 2 | 0 |
| Red corpuscles, 2% | 2 | 2 | 2 | 2 | 2 |

NOTE.—Developing 30 minutes at 37° C.

Reading:

1. The references
   - serum
   - antigen
   - (hemolytic couple)
   must be completely lysized.
2. The reaction tubes
   Notation in relation to a hemolysis scale of 1 to 4.
   The reaction must be positive +++ or strongly positive ++++.

TABLE I.—(I)—TITRATION OF THE HEMOLYTIC SERUM (HS)

[(1) Dilutions of the HS: carried out in accordance with the under-mentioned table with passage of the tubes (3 to 6 . . . 9), (4 to 7 . . . 10), (5 to 8 . . .)]

|  | No. of the tubes | | | | | | | | | |
|---|---|---|---|---|---|---|---|---|---|---|
|  | 1 | 2 | 3 | 4 | 5 | 6 | 7 | 8 | 9 | 10 |
| Physiological serum | 0 | 0.5 | 1 | 1.5 | 2 | 0.5 | 0.5 | 0.5 | 0.5 | 0.5 |
| HS | 0.5 | 0.5 | 0.5 | 0.5 | 0.5 | 0.5 | 0.5 | 0.5 | 0.5 | 0.5 |
| Obtained dilutions | 1 | 1 | 1 | 1 | 1 | 1 | 1 | 1 | 1 | 1 |
|  | 200 | 400 | 600 | 800 | 1,000 | 1,200 | 1,600 | 2,000 | 2,400 | 3,200 |

[(2) Titration: Introduce into tubes, according to the diagram, 0.1 ml. of each of the dilutions of the HS obtained above.]

|  | 1 | 2 | 3 | 4 | 5 | 6 | 7 | 8 | 9 | 10 | 11 |
|---|---|---|---|---|---|---|---|---|---|---|---|
| Diluted HS | 0.1 | 0.1 | 0.1 | 0.1 | 0.1 | 0.1 | 0.1 | 0.1 | 0.1 | 0.1 | 0 |
| Physiological serum | 0.4 | 0.4 | 0.4 | 0.4 | 0.4 | 0.4 | 0.4 | 0.4 | 0.4 | 0.4 | 0.6 |
| Complement diluted at 1/60 | 0.1 | 0.1 | 0.1 | 0.1 | 0.1 | 0.1 | 0.1 | 0.1 | 0.1 | 0.1 | 0 |
| Red corpuscles at 2% | 0.1 | 0.1 | 0.1 | 0.1 | 0.1 | 0.1 | 0.1 | 0.1 | 0.1 | 0.1 | 0.1 |

NOTE.—Developing 1 hour at 37° C.

The HS unit is given by the 1st tube completely hemolysed; one continues with 2 units in 0.1 ml. (2 drops) by taking double the dose of serum corresponding to this tube (the red corpuscles reference must not by lysed).

TABLE II.—(II) TITRATION OF THE COMPLEMENT

[This ascertainment must be carried out before each test]

|  | Nos. of the tubes | | | | | | | |
|---|---|---|---|---|---|---|---|---|
|  | 1 | 2 | 3 | 4 | 5 | 6 | 7 | T. Gr. 8 |
| Complement at 1/60 | 1 | 2 | 3 | 4 | 5 | 6 | 7 | 0 |
| Physiological serum | 7 | 6 | 5 | 4 | 3 | 2 | 1 | 12 |
| Lysate | 2 | 2 | 2 | 2 | 2 | 2 | 2 | 0 |

NOTE.—Fixing 1 hour at 37° C.

|  | Nos. of the tubes | | | | | | | |
|---|---|---|---|---|---|---|---|---|
|  | 1 | 2 | 3 | 4 | 5 | 6 | 7 | T. Gr. 8 |
| HS | 2 | 2 | 2 | 2 | 2 | 2 | 2 | 0 |
| Red corpuscles 2% of the bottom | 2 | 2 | 2 | 2 | 2 | 2 | 2 | 2 |

NOTE.—Developing 30 minutes at 37° C.

Reading:

The complement unit is given by the first completely hemolysed tube. One continues with 2 units, but in 8 drops.

PURIFYING TEST OF CARBON PARTICLES

Principle

The colloids formed of inert particles, carbon and colloidal metals, coloring matters called vital, etc., are phagocyted according to a regular exponential function of the concentration in relation to time which may be expressed by the equations:

(1) $$C = Co \times 10^{-KT}$$

(2) $$\frac{\log Co - \log C}{t - to} = K$$

$C$ = blood concentration of the colloid in mg./ml. after $t$ minutes
$Co$ = initial concentration.

The K constant of these equations, which defines the slope of the elimination curve in semi-logarithmic coordinates, measures of phagocytary activity, and is called phagocytary index.

Tests—Material and method

A male albinos mouse of 20, 25 gr. is given a venous injection suspension of Chinese ink corresponding to 8 mg. of carbon for 100 g.

This suspension is prepared in the following manner: 1 ml. of Chinese ink is diluted to 1/20 in the physiological solute containing 1% of gelatin. The ink used is the Pelikan brand, whose particles of about 200 A. appear to be perfectly dispersed and of homogeneous size. 0.5 ml. of this suspension is injected per animal.

Blood samples are taken at times of 1–5–10–20 minutes after the injection, by puncturing the retroorbitary venous plexus by means of a glass micro-pipette of 0.025 ml.

The bloods are lacquered in 2 ml. of carbonate of soda at 1‰ and doses of carbonate have been made with the Lunetron electrophotometer 40 2 E, in red light (620 m$\mu$).

A calibration curve has been made with dilutions of Chinese ink in carbonate of soda at 1‰ and containing 0.025 ml. of blood for 2 ml. of carbonate.

| Calibration curve carbon, mg./ml. of blood: | Transmission percentage |
|---|---|
| 0.5 | 76 |
| 1.0 | 62 |
| 1.5 | 50 |
| 2.0 | 42 |
| 2.5 | 34 |
| 3.0 | 26.5 |
| 3.5 | 22 |
| 4.0 | 18.5 |

The day of testing, 50 mice were made into two batches of 25 each. 1 batch was considered as reference and received, by subcutaneous means, 0.5 ml. of a sterile glycocollic solution at 10%. 1 batch was treated with 0.5 ml. of lysate obtained from a suspension of *N. perflava* containing $7.5 \times 10^9$ of germs/ml.

Immediately afterwards, a group of five mice of the reference batch and another of the test batch received, by venous means, the Chinese ink. Blood samples were taken as stated above.

Thus:

5 mice of each batch were examined at $t$ 0
5 mice of each batch were examined at $t$ 24 hours
5 mice of each batch were examined at $t$ 48 hours
5 mice of each batch were examined at $t$ 72 hours
5 mice of each batch were examined at $t$ 96 hours The K constant was thus established at the time stated for each animal (phagocytary index).

Results

By carrying the K constant to ordinates, calculated according to the formula given above, and in abscissae the times of 24 hours, 48 hours, 72 hours, 96 hours, were ascertained the stimulation or depression curve of the reticulo-endothelial system in time.

PHARMACODYNAMIC PROPERTIES

The study made of mice was carried out by means of a lysate obtained from a suspension of *Neisseria perflava* containing $150 \times 10^9$ germs/ml.

It showed the favorable influence that it produced for the reticulo-endothelial system.

Two proofs were used:

(A) Experimental infection by a virulent stock of *D. pneumoniae*.

The mortality percentage was as follows on the 3rd, 4th and 6th days.

|  | 3rd day | 4th day | 6th day |
| --- | --- | --- | --- |
| Reference animals, percent | 40 | 70 | 80 |
| Animals treated by the bacterial lysate diluted in ½₀ in sterile distilled water), percent | 0 | 20 | 40 |

(B) Carbon purifying test.—Appraisal of the phagocytary function of the S.R.E. by establishing the purification coefficient K after giving a venous injection of Chinese ink to mice.

The K values as a function of time are established as follows:

|  | To | T24 | T48 | T72 |
| --- | --- | --- | --- | --- |
| Reference animals | 0.020 | 0.024 | 0.024 | 0.014 |
| Treated animals |  |  |  |  |
| Bacterial lysate: |  |  |  |  |
| Diluted ½ | 0.020 | 0.082 | 0.068 | 0.032 |
| Diluted ⅕ | 0.020 | 0.056 | 0.054 | 0.046 |
| Diluted ½₀ | 0.020 | 0.038 | 0.034 | 0.022 |

TOXICOLOGY

The study carried out on the mouse with the lysate diluted to ½₀ shows that the DL 50, by intra-venous or intra-peritoneal means should be greater than 25 ml./kg.

The administering of doses varying from 0.5 to 10 ml./kg. with the rabbit, by venous method, does not modify the respiratory rhythm nor blood pressure.

Chronic toxicity carried out with a rabbit, by administering by intra-muscular method of 0.4 and 0.8 ml./kg. during 30 days, has shown perfect local and general tolerance.

Chronic toxicity carried out with a rat during three months at the rate of 1 and 5 ml./kg., did not show any sign of local or general or general intolerance, no macroscopic or microscopic lesion.

CLINICAL EXPERIMENTATION

Several medicament formulas have been entrusted to various expert clinicians in order to try out activity and tolerance.

In this way, in particular, an expert professor at the Paris Faculty of Medicine, doctor of Paris hospitals, has experimented in his department with the product corresponding to the formula:

|  | Ml. |
| --- | --- |
| Glycocollic lysate of the stock S 103 (*Niesseria perflava*) obtained on suspensions titrating 150 milliards of germs per ml. | 5 |
| Excipient, quant. suff. | 100 |

Distributed over phials of 5 ml.

Experimentation protocol

The expert's work covered sixteen patients, other research being at present in hand which will complete his conclusions.

(1) Selection of patients

This refers solely to in-patients (whose daily observation is hence easy). Moreover, it refers to routine cases in the regular activity of the service, thus enabling a comparative and objective judgment both on the part of the medical and nursing staff.

Ages ranged from 19 to 88; out of the sixteen patients, there were nine men and seven women. The duration of treatment was essentially a function of the results obtained:

whereas operative consequences that were particularly favorable stopped the treatment at the end of five days,
a hope of improvement of evolutive advance of epitheliomas under chemiotherapic antimitotic treatment led to continuing the treatment up to 25 days.

Therapeutic effects sought referred to:

(a) The action on a cancerous tumour already subjected to antimitotic therapeutics;

(b) The action on operative consequences of operations of the maxillofacial sphere which are known to be burdened with steady complications:

oedema
pain both intrinsic, a source of functional discomfort which is sometimes considerable, and in any case, very painful post-opareitve discomfort for the patient as it affects essential activities: swallowing, mastication, phonation The expert has studied:

(a) Local tolerance: problem of intra-muscular injections, so far as they were multiplied with certain patients.

(b) General tolerance: both at a clinical level (and patients subjected to an intensive chimiotherapy were particularly sensitive to any therapeutic act even a slight one) as well as biological by corpuscle counts and sedimentation speed (c) Activity: the results were classified into several groups:

very good results: when it was undeniable that the usual complications noticed were absent:
good results: when one or more complications were absent and the others very slight:
medium or even negative results: when evolution was similar to usual cases not treated by microbial lysate.

(2) Distribution of patients

They were classified into 4 groups:

Group I

Medical treatment of cancers of the maxillo-facial sphere: three cases:

a very evolved epithelioma of the tongue;
an epithelioma of the bottom of the mouth, also very evolved;
an epithelioma of the gums extending to the cheek and fistulised on the skin at a very perjorative stage.

As can be seen, this refers to three particularly severe cases of epitheliomas at a preterminal stage; hence arrived at a level of their evolution where any therapeutics becomes most often illusory. These are particularly delicate patients, often with a leucopeina which exposes them to superinfection, both local and general.

Group II

Surgical operations.

The product was used for post-operative purposes.

We were in the presence of seven cases made up as follows:

a condylar and sub-condylar resection for temporomaxilliary anchylosis;
curetting of an ameloblastoma;
a mandibular resection with immediate reconstitution by acryl prosthesis;
a mandubular resection with immediate reconstitution by acryl prosthesis and illiac graft;
isolating and disengaging of the lower dental nerve;
exeresis of an ossifiant fibroma of the lower maxillary;
exeresis biopsy of a jugulo-carotidian ganglion.

In this type of operation, the oedema is habitual, sometimes considerable, hundering the uniting of flaps and defavorizing stitches. Pains form part of the current table, often very severe for the patient, especially after a mandibular resection.

Here, the interpretating of the results is easy, for we know perfectly the conventional evolution of these operations.

Group III

Electro-coagulation for epithelioma.

Four cases, made up as follows:

epithelioma of the top lip;
epithelioma of the gums extending to the alveolary bone;
epithelioma of the tongue;
epithelioma of the lower lip.

This refers to a rather particular type of operation encountered. Electrosurgery sets up extensive burning always producing a serious, and sometimes considerable oedema, entailing hindrance to feeding and phonation. Pains are practically invariable.

Be that as it may, these signs vary as a function of the seat and extent of coagulation. A feverish reaction at 38.5° C at the 48th hour, lasting a day or more, is usual.

Sometimes, there are haemmoraghic complications The fall of the scab takes place between the 10th and 15th day.

Group IV

Traumatology, two cases:

a facial polytraumatism;
an infected fracture of the left horizontal branch of the mandible.

Oedema of the face, often impressive, is a regular sign of traumatisms of the maxillo-facial sphere. It hinders treatment, the reduction, either orthopedic or surgical. The super-infection of a fracture seat is an infrequent problem, but to be feared.

(3) Recapitulative table of results, 16 cases.

| Results | Group I | Group II | Group III | Group IV | Total |
|---|---|---|---|---|---|
| Very good | 0 | 2 | 2 | 0 | 4 |
| Good | 0 | 5 | 1 | 2 | 8 |
| Medium | 2 | 0 | 1 | 0 | 3 |
| Negative | 1 | 0 | 0 | 0 | 1 |
| Totals | 3 | 7 | 4 | 2 | 16 | being, out of sixteen cases:

12 good and very good results;
3 medium results;
1 negative result.

Tolerance

Out of the sixteen cases, the expert did not record any sign of intolerance: both at the local level: no problem at the injection points. This is remarkable with regard to a certain number of these patients who received almost daily intra-muscular injections.

as well as at a general level: there was no particular occurrence to deplore.
without thermic lameness.
no neurological, hepatic, nephrological, or hematological mishap;

and this, whatever the general condition of patients, which was often delicate.

CONCLUSION

On the whole, out of this series of sixteen observations, the expert has obtained an appreciable result, very excellent, in twelve cases.

The expert kept to a maximal posology of two phials per 24 hours. In view of the excellent tolerance of the product, one could consider increasing the doses in certain cases.

The novelty of the product and the proportion of encouraging results have decided the expert to continue experimentation, so long as the medicament proves to be perfectly atoxic.

Thus, in the favorable cases, it appeared to the expert that everything took place as if the system stood up to operative shock much better, which is an ineluctable consequence of any surgical act, and showed much better resistance to the complications inherent to each type of operation.

In the present state of these tests, the essential indications of the product appeared to him to be:

the operative consequence,
the traumatology, the usual posology being two phials per 24 hours. Taking our present knowledge into account, the product does not appear to comprise any formal counter-indications.

Seeing that the expert has obtained satisfactory results in 75% of his observations where he had not seen any sign of local or general intolerance, he was able to conclude that the proposed product has a decided therapeutical interest.

Furthermore, one has wished objectively to test the activity of the product by means of biological methods.

Thus, a dosage was made of the complement by the Kabat and Mayer method which shows significant differences, before and after treatment, as testified to by the following table:

| | Before | After |
|---|---|---|
| F | 61 | 84.4 |
| D | 89 | 98.4 |
| B | 55.5 | 109 |
| G | 25.6 | 62 |
| M | 46 | 94.5 |
| Mar | 57 | 107 |
| Ml | 72 | 101 |

I claim:

1. A substance imparting a non-specifice immunity and stimulating the nature defenses of the system, comprising the lytic conversion product of a microbial body contained in a soluble state from *Neisseria perflava* by the action at about 37° C. of glycocoll to entail the lytic conversion of living microbial bodies said glycocoll being added so that the final concentrations thereof are between 5 and 10% and the pH of the mixture is between 6 and 7, said action being continued until the lysis of at least 50% of the microbial bodies, said lytic conversion product titrating 150 milliards of germs/ml. for 100 ml. of solution distributed in 5 ml. phials.

2. A method of stimulating the natural defenses of the reticulo-endothelial system comprising administering to a subject a composition in accordance with claim 1.

3. A method in accordance with claim 2 wherein the active product in said composition is in lyophilized form.

References Cited

FOREIGN PATENTS 2,892   11/1964   France _____ 424—92

OTHER REFERENCES

Greenberg et al., Canad. M.A.J. vol. 84, p. 945, April 1961.

Lehy-Bouville, Soc. Biol., vol. 155, pp. 2457–2461, December 1961.

Maculla et al., Science, vol. 107, pp. 376–377, April 1948.

RICHARD L. HUFF, Primary Examiner

UNITED STATES PATENT OFFICE
CERTIFICATE OF CORRECTION

Patent No. 3,567,822          Dated March 2, 1971

Inventor(s) Raymond Francois Jacques Sarbach et al.

It is certified that error appears in the above-identified patent and that said Letters Patent are hereby corrected as shown below:

Column 2, line 58, after "deviation" insert --reaction--.

Column 3, line 29, change "+++" to --++++--.

Column 4, line 28, change "in" to --is--.

Column 6, line 43, change "post-opareitve" to --post-oper

Column 6, line 73, change "perjorative" to --pejorative--

Column 8, line 58, in the table under G, Before, "25.6" s be --26.6--.

Claim 1, column 8, line 64, "specifice" should be --specific--.

Claim 1, column 8, line 65, "nature" should be --natural-

Signed and sealed this 17th day of August 1971.

(SEAL)
Attest:

EDWARD M. FLETCHER, JR.                WILLIAM E. SCHUYLER, JR.
Attesting Officer                       Commissioner of Patents